United States Patent
Kulkarni et al.

(10) Patent No.: US 11,843,764 B2
(45) Date of Patent: Dec. 12, 2023

(54) VIRTUAL REALITY HEADSETS AND METHOD OF MANAGING USER EXPERIENCE WITH VIRTUAL REALITY HEADSETS

(71) Applicant: Hewlett-Packard Development Company, L.P., Spring, TX (US)

(72) Inventors: Anuradha Kulkarni, Pune (IN); Tulit Pal, Pune (IN); Narendra Kumar Chincholikar, Pune (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 62 days.

(21) Appl. No.: 17/507,012

(22) Filed: Oct. 21, 2021

(65) Prior Publication Data

US 2022/0124304 A1   Apr. 21, 2022

(30) Foreign Application Priority Data

Oct. 21, 2020 (IN) .............................. 202041045941

(51) Int. Cl.
| | |
|---|---|
| *G06F 15/16* | (2006.01) |
| *H04N 13/383* | (2018.01) |
| *H04N 13/344* | (2018.01) |
| *G06N 20/00* | (2019.01) |
| *H04N 13/324* | (2018.01) |

(52) U.S. Cl.
CPC ........... *H04N 13/383* (2018.05); *G06N 20/00* (2019.01); *H04N 13/324* (2018.05); *H04N 13/344* (2018.05)

(58) Field of Classification Search
CPC .... H04N 13/383; H04N 13/30; H04N 13/324; H04N 13/332; H04N 13/344; G06N 20/00

USPC ............................................... 348/51, 53, 55
See application file for complete search history.

(56) References Cited

U.S. PATENT DOCUMENTS

| | | | |
|---|---|---|---|
| 6,012,926 A | 1/2000 | Hodges et al. | |
| 10,268,888 B2 | 4/2019 | Osterhout et al. | |
| 11,128,636 B1 * | 9/2021 | Jorasch | ................... G06V 20/10 |
| 11,451,758 B1 * | 9/2022 | Chaurasia | ............ H04N 13/133 |
| 2016/0026253 A1 | 1/2016 | Bradski et al. | |
| 2016/0077547 A1 * | 3/2016 | Aimone | ................ A61B 5/1114 345/8 |
| 2018/0364801 A1 * | 12/2018 | Kim | ..................... H04N 13/344 |

(Continued)

FOREIGN PATENT DOCUMENTS

| | | |
|---|---|---|
| KR | 10-2113634 B1 | 5/2020 |
| TW | 202027042 A | 7/2020 |

OTHER PUBLICATIONS

Aimed; Why We Should Embed AI Into Virtual Reality Headsets; Dec. 27, 2018.

(Continued)

*Primary Examiner* — Bharat Barot
(74) *Attorney, Agent, or Firm* — Quarles & Brady LLP

(57) ABSTRACT

A method of managing user experience with a virtual reality (VR) headset includes: with a server, receiving data from a number of sensors that are detecting parameters associated with a user during use of the VR headset; with the server, analyzing the data from the sensors to predict a negative effect on the user from the use of the VR headset; and with the server, taking action to minimize the negative effect on the user that is predicted.

20 Claims, 11 Drawing Sheets

(56) References Cited

U.S. PATENT DOCUMENTS

| | | | | |
|---|---|---|---|---|
| 2019/0046859 A1* | 2/2019 | Vijil | ................... | A63B 71/0622 |
| 2019/0282910 A1* | 9/2019 | Ando | ....................... | G09B 9/02 |
| 2019/0328305 A1* | 10/2019 | Wood | ...................... | A61B 5/40 |
| 2019/0366030 A1 | 12/2019 | Giap et al. | | |
| 2020/0320592 A1* | 10/2020 | Soule | .................. | H04L 63/0861 |
| 2021/0383912 A1* | 12/2021 | Jackson | ................ | A61M 21/02 |

OTHER PUBLICATIONS

Anderson Augusto Simiscuka; Real-Virtual World Device Synchronization in a Cloud-enabled Social Virtual Reality IoT Network; Dublin City University; Aug. 5, 2019.

\* cited by examiner

| Did you experience any of the following during your VR session? | None | Mild | Moderate | Severe | Can't Say |
|---|---|---|---|---|---|
| Eyestrain |  | X |  |  |  |
| Headache | X |  |  |  |  |
| Nausea | X |  |  |  |  |
| Disorientation | X |  |  |  |  |

*Fig. 8A*

| | Strongly Agree | Agree | Disagree | Strongly Disagree | Can't Say |
|---|---|---|---|---|---|
| Game was fun to play | X | | | | |
| Would recommend to friends | X | | | | |
| Game was well designed | | X | | | |
| Game was boring | | | X | | |

Suggestions: (If any)

*Your suggestions would help us improve the game*

*Fig. 8B*

VIRTUAL REALITY HEADSETS AND METHOD OF MANAGING USER EXPERIENCE WITH VIRTUAL REALITY HEADSETS

BACKGROUND

Virtual Reality (VR) is a technology in which various devices are used to stimulate a user's senses to simulate a desired setting and perhaps course of events. Typically, the user wears a headset that displays images and produces the sounds of the virtual environment for the user's eyes and ears. The user is then able to interact with the virtual environment using additional system components that detects the user's actions, which are reflected in the output of the VR system. Virtual Reality is becoming an important technology in a variety of fields and applications. For example, VR is used for training simulations, gaming and remote consultation and collaboration. As VR technology becomes more effective and useful, users naturally spend longer amounts of time using a VR system, e.g., wearing a VR headset.

BRIEF DESCRIPTION OF THE DRAWINGS

The accompanying drawings illustrate various implementations of the principles described herein and are a part of the specification. The illustrated implementations are merely examples and do not limit the scope of the claims.

FIG. 8A is an illustrative user interface for conducting a survey, consistent with the disclosed implementations.

FIG. 8B is an illustrative user interface for conducting a survey, consistent with the disclosed implementations.

Throughout the drawings, identical reference numbers designate similar, but not necessarily identical, elements.

DETAILED DESCRIPTION

Figure 1:
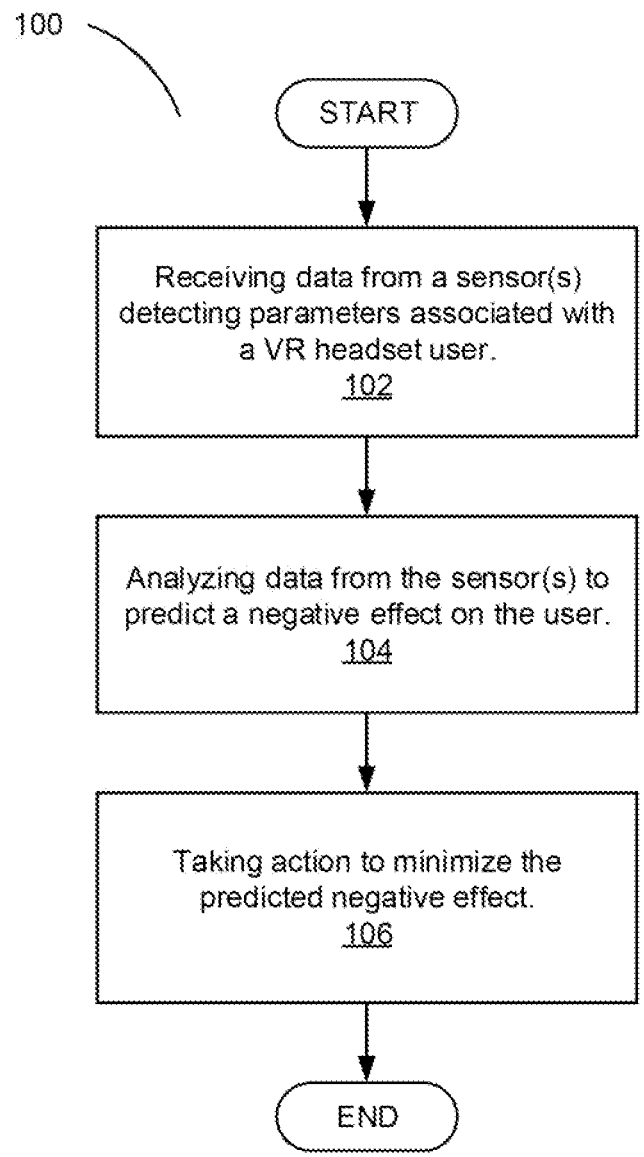
FIG. 1 is a flowchart showing an illustrative method of managing a user experience with a VR headset, consistent with the disclosed implementations.

As noted above, Virtual Reality (VR) is a technology in which various devices are used to stimulate a user's senses to simulate a desired setting and perhaps a course of events. Typically, the user wears a headset with a display device mounted over the user's eyes and speakers for the user's ears through which images and sounds of the virtual environment are provided for the user.

The user is then able to interact with the virtual environment using additional system components that detect the user's actions. For example, movement of the user's head will change the images being displayed as though the user were looking around within the simulated reality. The user may also interact with objects that are display in the virtual environment. Both the actions of the user and the results of that action may be represented in the output, e.g., images and sound, of the VR system.

As VR technology becomes more effective and useful, users naturally spend longer amounts of time using a VR system, e.g., wearing a VR headset. This extended usage of the VR system may cause negative effects for the user, such as fatigue, eye strain, headaches and others.

Consequently, this specification describes a virtual reality headset and supporting system and methods that seek to improve the user experience. For example, the user may register with the system which then monitors sensors detecting aspects of the user's condition while operating the VR equipment. This data is used to make predictions about discomfort or negative side effects the user may experience from using the VR equipment. Actions are then taken to mitigate the predicted issues.

In one example, a method of managing user experience with a virtual reality (VR) headset includes, with a server, receiving data from a number of sensors that are detecting parameters associated with a user during use of the VR headset; with the server, analyzing the data from the sensors to predict a negative effect on the user from the use of the VR headset; and with the server, taking action to minimize the negative effect on the user that is predicted.

In another example, a virtual reality headset includes: a display for displaying a virtual reality program to a user; an eye sensor for sensing parameters of an eye of the user during use of the headset; a wireless transceiver; and a processor. The processor is programmed to use the wireless transceiver to: communicate with a number of peripheral devices that provide sensor data indicative of user activity or condition; transmit sensor data from the peripheral devices and eye sensor to a server for predicting negative effects of using the headset of the user; and receive instructions from the server to take an action to mitigate a negative effect on the user from use of the headset.

In another example, a non-transitory computer-readable medium comprising instructions that, when executed, cause a server to: receive, via a network interface, data from a number of sensors that are detecting parameters associated with a user during use of a VR headset; operate an artificial intelligence unit to analyze the data from the sensors, the data from the number of sensors detecting parameters associated with the user during use of the VR headset including detection of a condition or action of the user while using the VR headset, the data being applied to machine learning of the artificial intelligence unit to predict a negative effect on the user from the use of the VR headset; and instruct the VR headset to take specific action based on a prediction made by the artificial intelligence unit to minimize a predicted negative effect on the user.

FIG. 1 is a flowchart showing an illustrative method of managing a user experience with a VR headset. In the example of FIG. 1, the method is performed by a server that is in communication with and supporting the VR headset.

As shown in FIG. 1, the method 100 of managing user experience with a virtual reality (VR) headset includes, with a server, receiving data 102 from a number of sensors that are detecting parameters associated with a user during use of the VR headset. As will be described in more detail below, these sensors may include one or more eye sensor detecting the actions and conditions of the user's eyes in the VR headset. The sensors may also include a heart monitor detecting the heart activity, pulse or blood pressure, of the user. The sensors may also include a breath sensor to detect the user's breath pattern. The sensor may also include a thermometer to detect the user's temperature, either an internal or skin temperature and possibly an ambient temperature. The sensor may also include a timer that records the amount of time the VR system has been in use by the user. The sensor may include an electro-magnetic field sensor to detect an amount of electro-magnetic field exposure experienced by the user. Any sensor detecting a condition of the user, the operation of the VR system or the user's environment may be included to provide information that may be useful in quantifying or predicting aspects of the user's experience with the VR system.

Next, the method includes, with the server, analyzing the data from the sensors 104 to predict a negative effect on the user from the use of the VR headset. For example, exceeding a particular amount of time using the VR system may indicate that the user is likely to experience a headache, disorientation when discontinuing the VR environment to return to reality, eye strain, concern over the amount of time spent and other negative effects. In another example, detecting an amount of radiation output to the user's eyes over time by the VR system may indicate likely eye strain, sense of fatigue or other negative effects. In another example, detecting unusual vital signs in the user may indicate a strongly negative emotional response to something being portrayed in the virtual environment. Any potentially negative effect that can be predicted may be associated with corresponding sensors, the output of which is analyzed to ascertain or predict the negative effect being considered.

As a result, the method includes, with the server, taking action to minimize the negative effect on the user that is predicted. For example, if an excessive amount of VR system usage has elapsed, the user may be prompted to discontinue using the system or the system may be automatically deactivated. In other examples, parameters of the system, such as color tone, audio volume or radiation intensity may be adjusted to mitigate potentially negative effects on the user.

Figure 2:
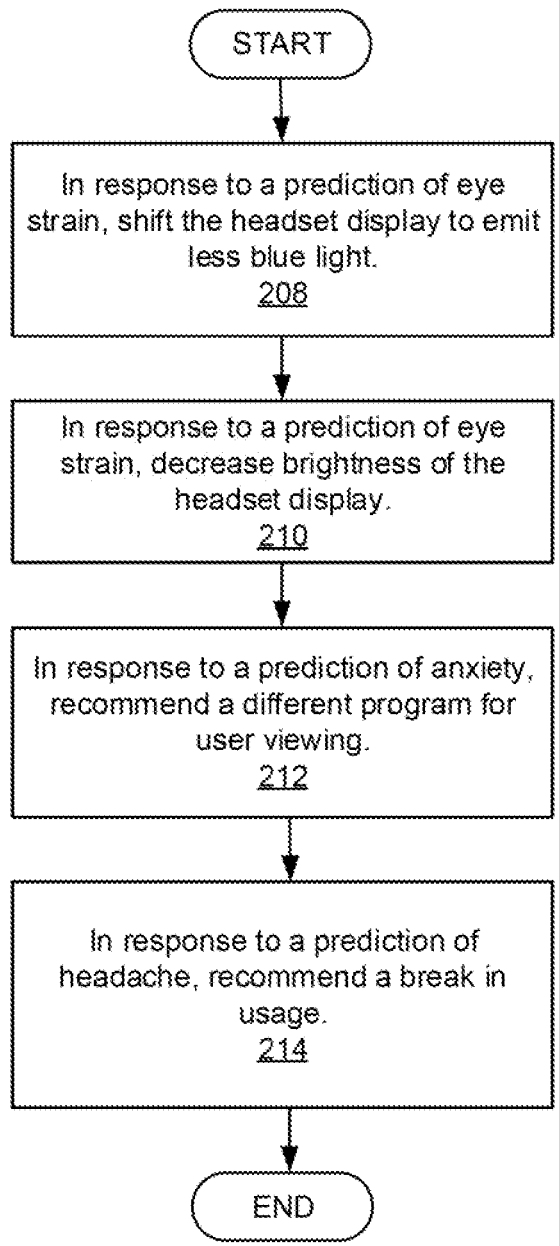
FIG. 2 is a flowchart showing some illustrative responses a system may take to manage user experience, consistent with the disclosed implementations.

FIG. 2 is a flowchart showing some illustrative responses 200 a system may take to manage user experience, consistent with the disclosed implementations. Each block in FIG. 2 describes a different action that might be taken to mitigate a predicting negative effect on the user from using the VR system.

For example, in response to a prediction of eye strain, the server may instruct the VR headset to shift the display in the VR headset to emit less blue light 208. The prediction of eye strain may be based on the amount or color of radiation that has been output to the user by the VR headset, the amount of time the user has been operating the VR headset, the activity of the user's eyes, ambient conditions such as humidity and other factors. Displays that emit less light in the blue part of the visible spectrum are known to cause less strain to human eyes.

In another example, the system may respond to a prediction of eye strain by the server instructing the VR headset to decrease the brightness of the headset's display (210). A less bright display can also mitigate eye strain.

In another example, the system may predict that the user is experiencing excessive anxiety, perhaps due to the content being displayed in the VR headset. This condition may be predicted, for example, based on user heart activity, user temperature, user perspiration and/or user breathing patterns and other similar parameters. In response to such a prediction, the server may instruct the VR headset to recommend a different program for viewing by the user (212).

In another example, the system may predict that the user is experiencing or will experience a headache. This prediction may be based, for example, on the elapsed time the user has been operating the VR headset, user eye activity and other user conditions. In response, the server of the system may decrease a volume level of the audio in the VR headset. Alternatively, the server may instruct the VR headset to provide a prompt to the user, visual or audio, recommending a break in headset usage 214. Alternatively, the server may deactivate the VR headset automatically and may disable the VR headset for at least a minimum amount of time 214.

Figure 3:
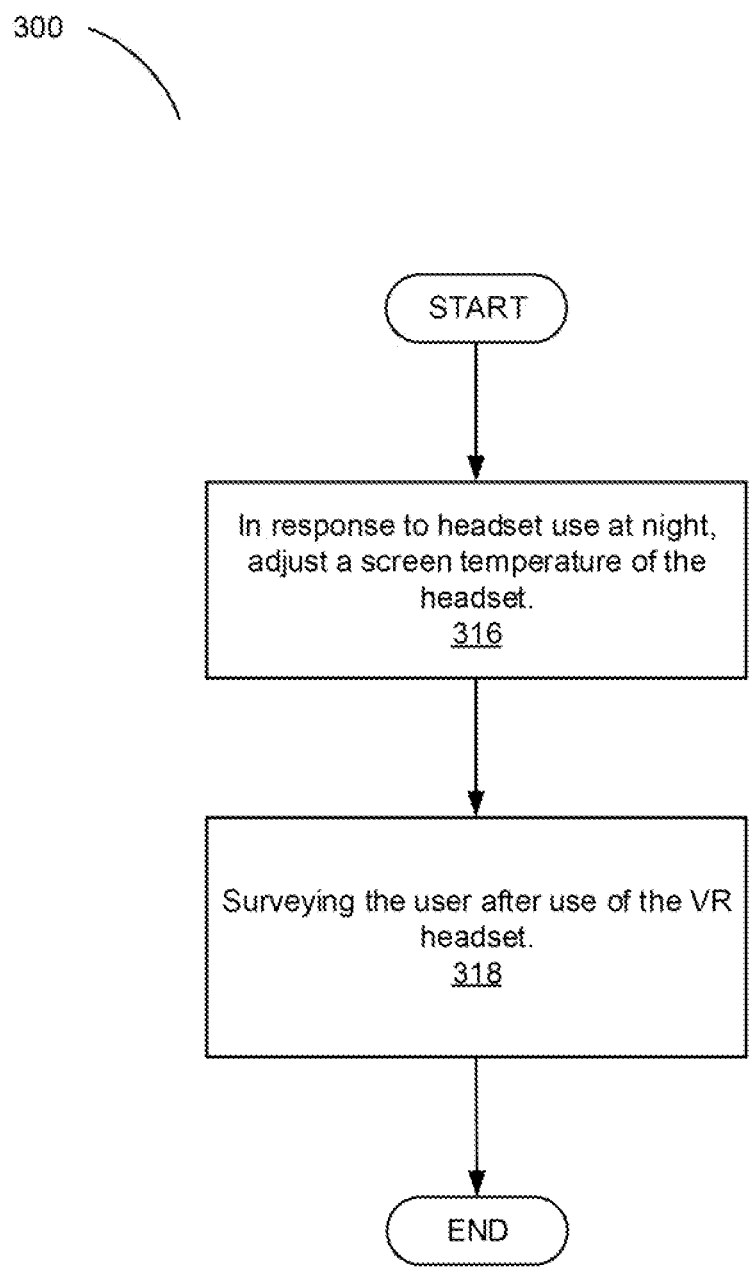
FIG. 3 is a flowchart showing some additional illustrative actions the system may take to manage user experience, consistent with the disclosed implementations.

FIG. 3 is a flowchart showing some additional illustrative actions the system may take to manage user experience, consistent with the disclosed implementations. As shown in FIG. 3, the system may also react to the time of day in which the VR headset is used to mitigate potential negative effects on the user.

For example, the VR headset may be used during nighttime hours, defined as after sundown and before sunup. This period of the day is typically characterized by lower ambient temperatures. Accordingly, in response to the VR headset being used during nighttime hours, the server may instruct the VR headset to adjust a screen temperature of the display device in the VR headset (316). The screen temperature may be made warmer, with fewer blues and more reds. As with other actions described herein, this may mitigate negative effects on the user from operating the VR headset.

At least some of the parameters of the responses taken by the system when predicting a negative effect may be set in advance by the user. For example, the user may know that, when experiencing eye strain or headache, a particular response by the system is most helpful. Thus, the system may accept user input that specifies that, in the event of a prediction of eye strain, the user prefers the system to react by reducing blue light emissions, by reducing display brightness or a combination of both. In another example, the user input may specify that, in the event of VR headset usage exceeding a set amount of time or a prediction of headache or eye strain, the system is to automatically deactivate the VR headset and, in some examples, deactivate the VR headset for a minimum amount of time.

Associated with receiving such user input specifying operational parameters of the system, the method of managing user experience may include surveying the user to better understand and quantify the user experience. Thus, as also illustrated in FIG. 3, the method may include expressly surveying the user after use of the VR headset to determine an extent to which any actions taken by the server were perceived to actually benefit user experience 318.

This survey may be administered through the VR headset. For example, the VR headset may display survey questions and record user input in response using the VR system components that track user action and create electronic user input. Alternatively, the survey could be administered to the user on another device, such as a computer or smartphone that the user has access to after the VR session.

Figure 4:
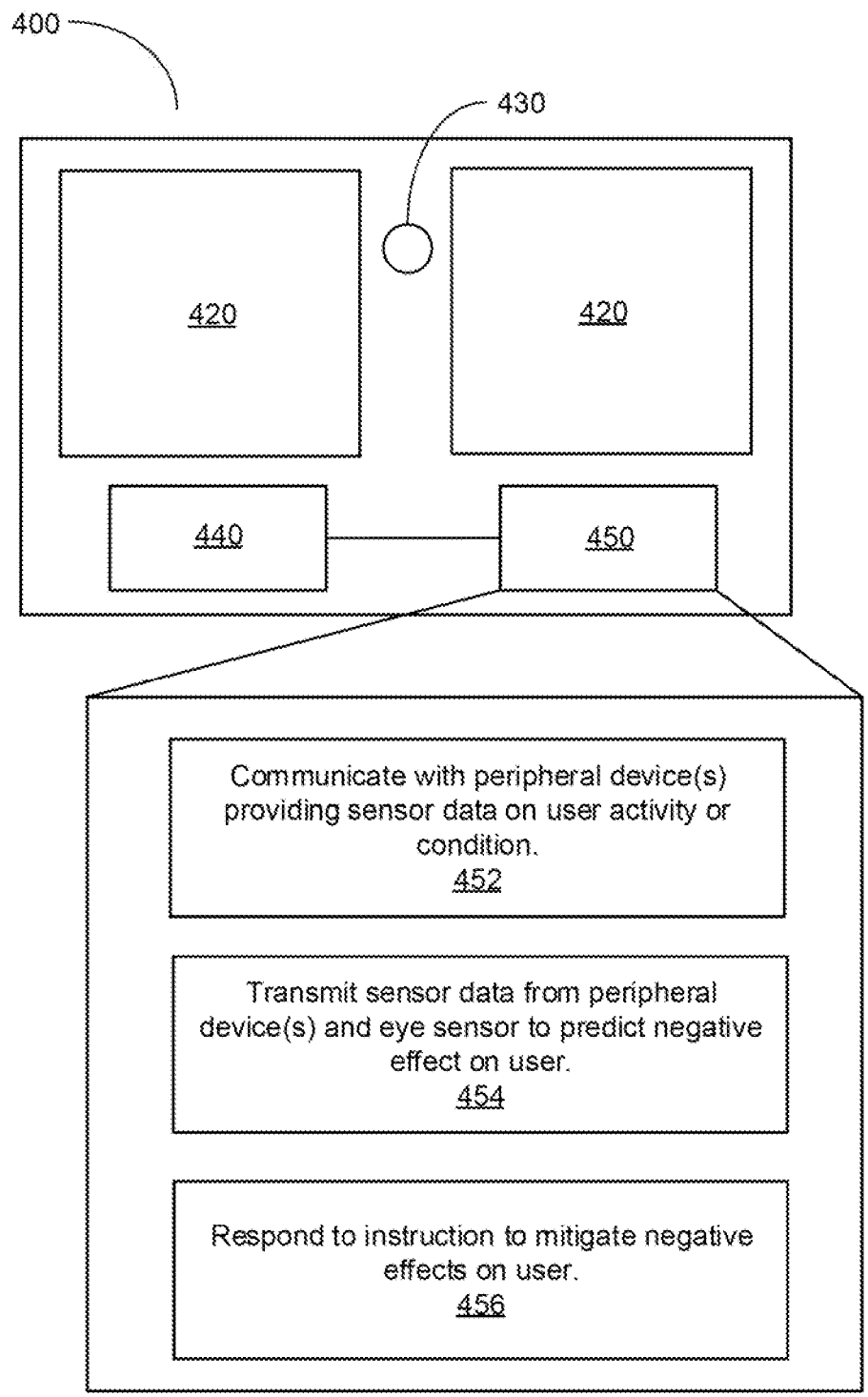
FIG. 4 is a diagram of a VR headset, consistent with the disclosed implementations.

FIG. 4 is a diagram of a VR headset, consistent with the disclosed implementations. As shown in FIG. 4, the VR headset 400 includes a display 420 for displaying a virtues reality program to a user. This display 420 may be a single display device or may be two separate display devices, one for each eye of the user.

The VR headset also includes an eye sensor 430 for sensing parameters of an eye of the user during use of the headset. This sensor 430 may be a single sensor or multiple sensors. For example, the eye sensor 430 may include a camera for capturing eye movement, pupil dilation, blink rate, widening of the eyes and other parameters of the eye or eyes of the user.

The VR headset also includes a wireless transceiver 440 and a processor 450. The wireless transceiver 440 can communicate with other peripheral devices, including user input devices and sensors trained on the user. The wireless transceiver 440 can also communicate with the system server described above to provide sensor data and receive instructions for the VR headset from the server, as described herein.

Thus, the processor 440 is programmed to use the wireless transceiver to: communicate with a number of peripheral devices 452 that provide sensor data indicative of user activity or condition. The processor 440 is further programmed to use the wireless transceiver to transmit sensor data 454 from the peripheral devices and eye sensor to a server for predicting negative effects of using the headset on the user; and receive instructions 456 from the server to take an action to mitigate a negative effect on the user from use of the headset.

Figure 5:
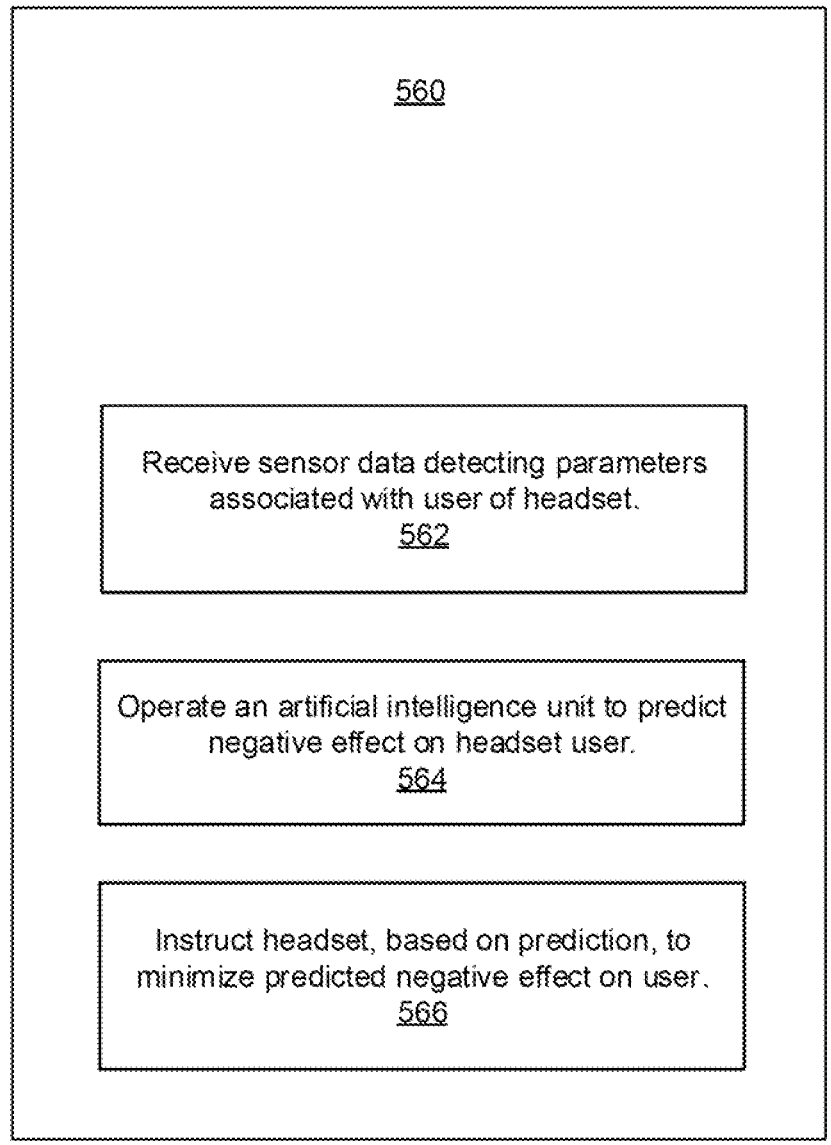
FIG. 5 is a computer readable storage medium containing instructions to reduce VR health impacts, consistent with the disclosed implementations.

FIG. 5 is a non-transitory computer readable storage medium containing instructions for a server of the system being described, consistent with the disclosed implementations. As shown in FIG. 5, the computer-readable medium comprising instructions that, when executed, cause a server to: receive 562, via a network interface, data from a number of sensors that are detecting parameters associated with a user during use of a VR headset. The instruction also cause the server to operate an artificial intelligence unit 564 to analyze the data from the sensors, the data from the number of sensors detecting parameters associated with the user during use of the VR headset including detection of a condition or action of the user while using the VR headset, the data being applied to machine learning of the artificial intelligence unit to predict a negative effect on the user from the use of the VR headset.

After such analysis, the medium includes instructions causing the server to instruct 566 the VR headset to take specific action based on a prediction made by the artificial intelligence unit to minimize a predicted negative effect on the user. Various examples of such actions are described above. The actions may include any actions within control of the server or VR headset/system that may mitigate a predicted negative effect on the user from use of the VR system.

Figure 6:
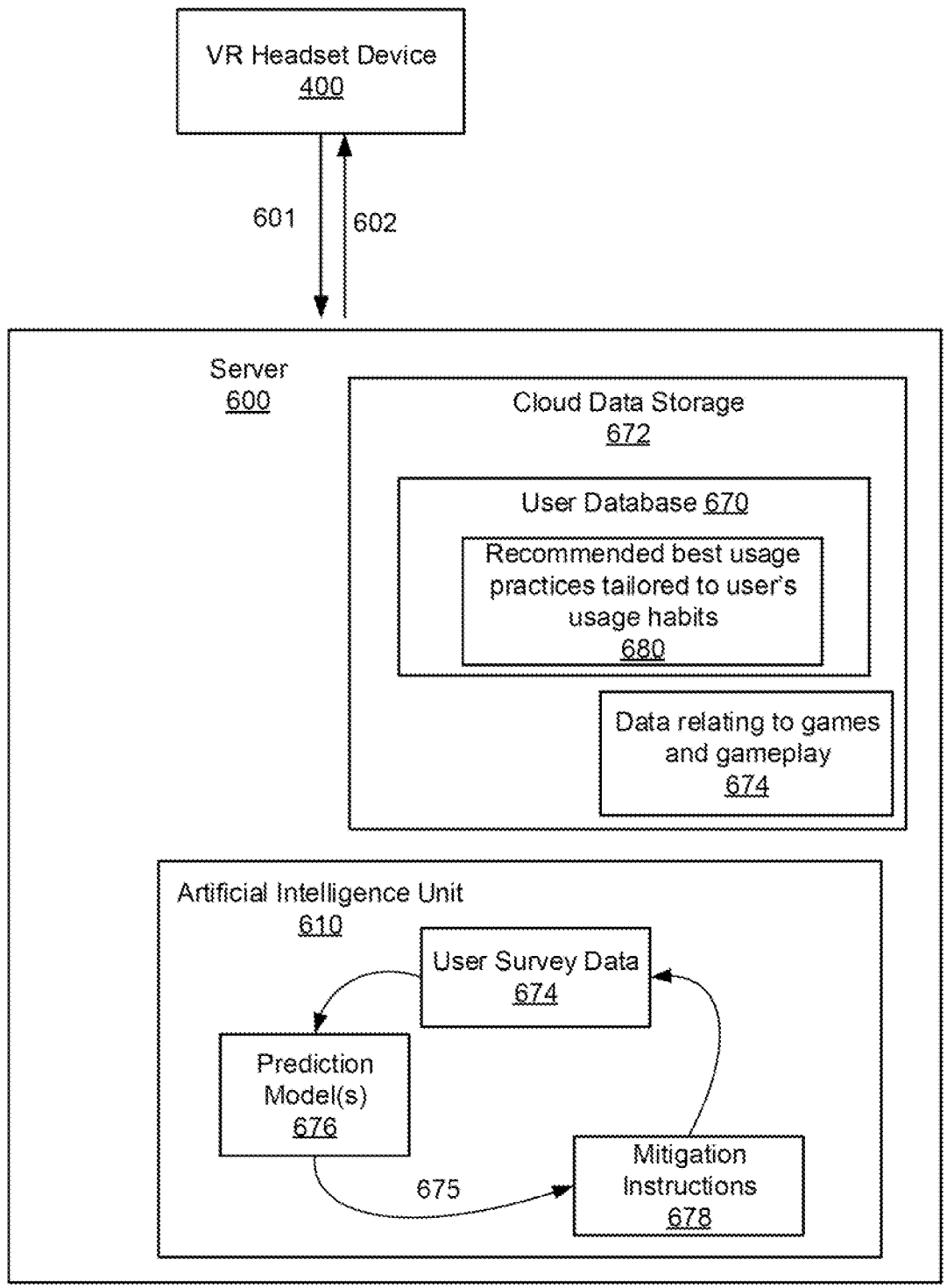
FIG. 6 is an illustrative system, including a VR headset, for reducing VR side effects, consistent with the disclosed implementations.

FIG. 6 is an illustrative system, including a VR headset, for reducing VR side effects, consistent with the disclosed implementations. As shown in FIG. 6, the VR headset 400 communicates with a server 600. This communication may be over the Internet or some other data network. As described above, the VR headset transmits sensor data 601 to the server 600 and receives from the server instructions 602 including instructions to mitigate potentially negative effects on the user.

Within the server 600, is an Artificial Intelligence (AI) unit 610. The AI unit 610 includes machine learning in which predictions 675 of negative effects on the user are generated according to one or more models 676 that use sensor data 601 as input. These predictions 675 are associated with a one or more mitigation instructions 678 that seek to alleviate or avoid the negative effect. As noted above, user survey data 674 may be captured after implementation of a mitigation instruction 678 to understand the effectiveness of the mitigation instruction 678 for that particular user. This user survey data 674 is used by the AI unit through machine learning to update the models 676 that generate the predictions 675.

The server 600 may include or have access to cloud data storage 672. In the cloud data storage, 672, there is a user database 670. This user database 670 may record identifying information for different individual users, such as facial recognition, retinal pattern, etc. The user database may also include the user input a user has given to register with the server 600 and parameters for the mitigation instructions the server 600 may send to the user's VR headset, as discussed above. The user database may also include a profile for each user including such information as age, gender, preferences, etc. In this way, multiple users may use the same VR headset, and the system/headset can react accordingly and differently for the different headset users.

As mitigation instructions are developed that are particularly or most effective to a given user, the recommended best usage practices 680 for that user can be stored in the cloud data storage 672 to guide in which mitigation instructions are issued to the VR Headset 400 and when. The cloud data storage 872 may also store other user data, such as data related to games and gameplay for different individual users.

An example schema for the user database 670 may be as follows.

1. VR_User: User_ID, Address, Zip, User_Since
2. VR_Usage_History: User_ID, Usage_ID, Date, Duration, Movie Name, Game Name, Story Name, Education, Automotive
3. Health_Issue: User_ID, Usage_ID, Headache(Y/N), Eye Pain(YIN), Nausea(Y/N), General Discomfort(Y/N), Radiation_Exposure(duration)
4. User_Experience Use_ID, Usage_ID, Rating (rating range e.g. 1 to 5), Gaming_Control_Exp (rating range e.g. 1 to 5), Emotions_Exp (rating range e.g. 1 to 5)

This information for each user can inform the predictions that are made about the effects of the VR system usage on that particular user. As described, actions can then be taken accordingly in an automated matter. Some of automation use cases are:

1. If user is using VR at night or eye strain reaches certain threshold: Adjust VR screen temperature accordingly. For this functionality, the system will fetch user's current time i.e. system time. Then, using the operating system's built in functionality, the system can control screen temperature. For a second case, the system uses eye activity data for predicting eye fatigue. Using this data, the system has a threshold for increased eye strain and takes the same action of setting screen temperature.

2. If user is using the VR system for a relatively long time (exceeding a time threshold): Take action to turn VR headset off for 15 mins. In this case, the system may notify the user with a countdown of, for example, 10 seconds, before the VR headset is deactivated. If the VR headset is seeking power from a supporting personal computer through a wired connection, the VR headset can be disabled by disabling that specific port of the personal computer for a period of time, e.g., 15 minutes and then resume.

3. If user is idle for 10 mins (e.g., the user falls asleep while watching): Turn off the VR headset. In other instances, the system is using eye data for predicting eye fatigue. This same data can be used to determine if any user eye movement is happening or not. If the user is idle for a period of time, e.g., 10 minutes, the system can deactivate the VR headset, again, for example, by disabling a port of a computer that is supporting the VR headset.

4. Suggesting content according to heart rate: Suggest comedy content if heart rate exceeds a threshold or limit. As described herein, the system may connect wirelessly to a smart band which can report the user's pulse rate. For example, the user is watching a war scene, and the system notes that the user's pulse rate has increased over the established limit. The system may then prompt the user to switch to comedic or other light content to help the user normalize.

5. Survey will be taken from user for a game after a time interval or once the user completes a certain mission in the game. This data 674 will be recorded in the cloud data storage 672 and may then be provided to game developers to improve their performance and overall environment.

Figure 7:
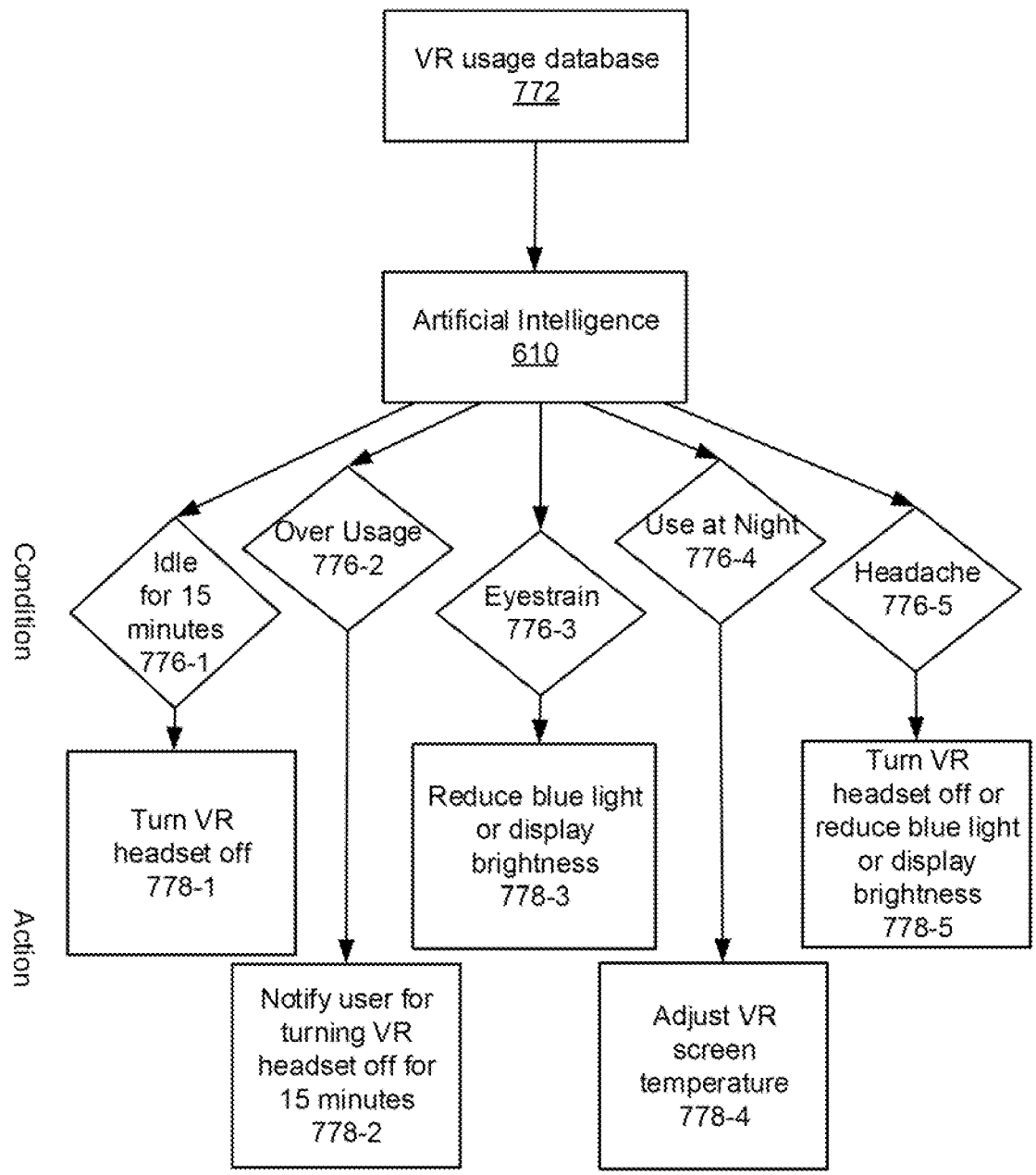
FIG. 7 is a flowchart illustrating a method of reducing VR health impacts, consistent with the disclosed implementations.

FIG. 7 is a flowchart illustrating a method of reducing VR health impacts, consistent with the disclosed implementations. FIG. 7 illustrates the initial training of the artificial intelligence unit 610 to develop the prediction models described in FIG. 6.

A database 772 of Virtual Reality system usage may be used to train the AI unit 610. This database may include data from a large number of VR sessions in which parameters of the use and conditions of user were tracked. The database 772 may also include user survey data describing or quantifying negative effects that the users reported experiencing the VR sessions. The larger this database 772, the better for training the AI unit 610.

As shown in FIG. 7, the AI unit 610 may use the data from the database 772 to generate a number of scenarios in which a corrective action is taken. In addition to those described above, the AI unit 610 may recognize idleness 776-1 of the user or the VR unit for a threshold period of time, e.g., 15 minutes. In response, the AI unit 610 will issue an instruction 778-1 to deactivate the VR headset.

In another case, the AI unit 610 may recognize that the usage of the VR unit has exceeded some threshold, e.g., a time limit. In response to this over usage 776-2, the AI unit 610 may issue an instruction to notify the user to discontinue use 778-2, e.g. for a minimum period of time such as 15 minutes. This prompt to the user may be made through the VR headset. Alternatively, as noted above, the AI unit 610 could issue an instruction automatically deactivating the VR system.

In still another case, the AI unit 610 may recognize conditions indicative of, or likely to cause, eyestrain 776-3. In response the AI unit 610 may shift the display to avoid blue light or may decrease the brightness of the display 778-3. Similarly, the AI unit 610 may recognize that the use is occurring at night 776-4 and shift the color to warmer colors or reduce the blue in the colors displayed to the user to adjust the screen temperature 778-4. Similarly, the AI unit 610 may recognize conditions indicative of, or likely to cause, headache 776-5, and record with corresponding actions 778-5. The headache mitigation may include reducing the brightness of the images in the VR headset, reducing the amount of blue light in the displayed images, or pausing use of the VR headset for a period of time.

Lastly, as noted above the AI unit 610 or the system may recognize that the system is being used at night 776-4. The system may respond by adjusting the temperature of the display screen in the VR headset.

FIG. 8A is an illustrative user interface for conducting a survey 800, consistent with the disclosed implementations. The survey 800 provides questions on health impacts from the VR system and solicits feedback from the user about which effects the user experienced. For example, the survey 800 may inquire about eye strain, headache, nausea, and disorientation. The survey 800 may provide for a ranking of the severity of the health impacts. In the example survey 800 shown in FIG. 8A, the rankings are none, mild, moderate, and severe. Other rankings may be used including number rankings, e.g. 1-5. The feedback from the survey provides information on the symptoms the user experienced and the effectiveness of mitigation strategies provided by the AI unit 610.

FIG. 8B is a survey 800, consistent with the disclosed implementations. In some examples, the system includes a survey 800 of the user's experience with the content displayed by the system. The system may provide a survey 800 to determine a users experience. This information may be provided to developers or others to improve the content. In some examples, the comments of the survey may be parsed using natural language analysis to extract health impacts from VR usage. For example, a comment which includes the term headache or anxiety may prompt a symptom survey from the system.

Figure 9:
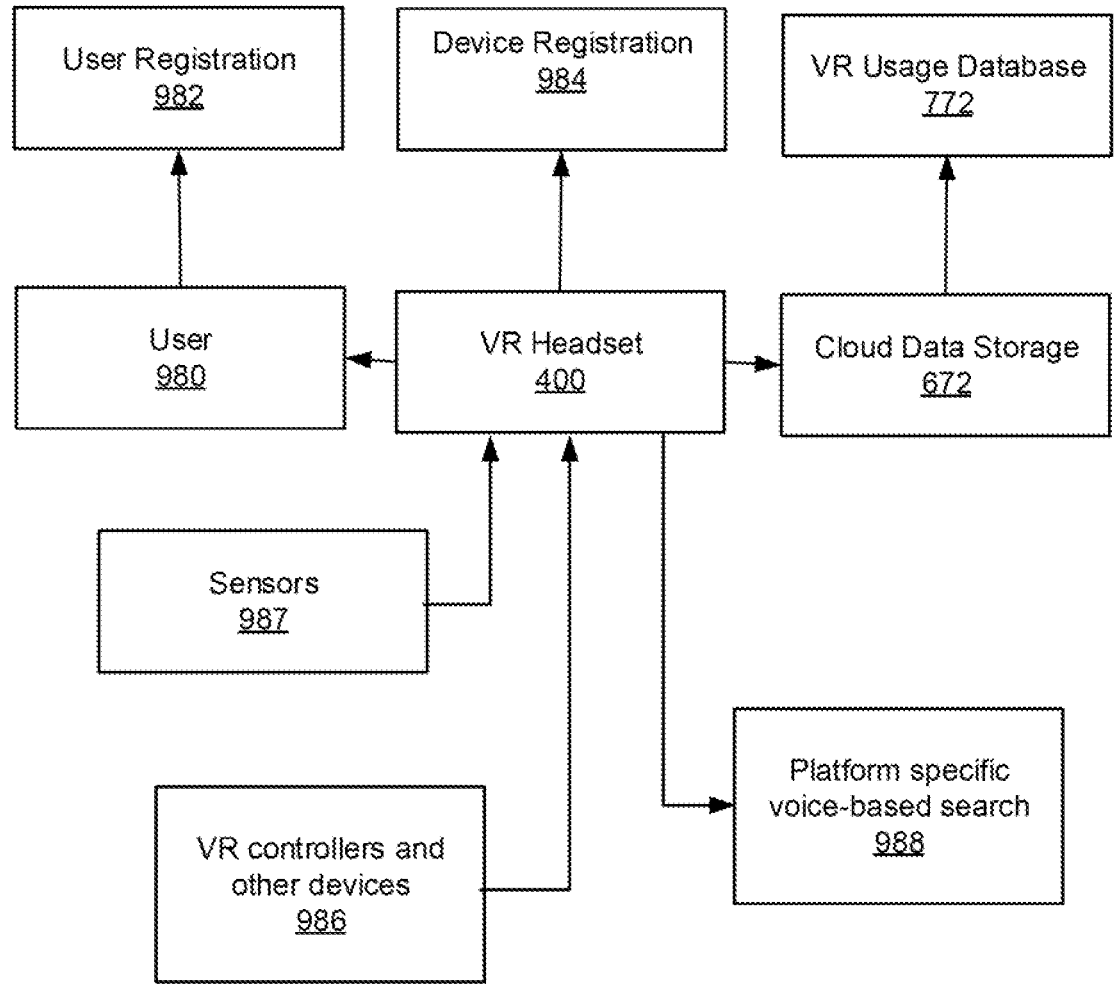
FIG. 9 is a system for reducing VR health impacts, consistent with the disclosed implementations.

FIG. 9 is a system for reducing VR health impacts, consistent with the disclosed implementations. As shown in FIG. 9, the VR headset 400 is operated by the user 980. The VR headset 400 may receive data from any number of sensor 987 related to the use of the VR headset 400. For example, the sensors 987 may include a smart band or heart monitor that senses a physical condition of the user such as heart activity, perspiration, temperature (internal or external), respiration, etc.

The VR headset 400 may also receive input from various VR controllers or other devices 986 such as a joystick, trackball, wand or the like. These peripheral devices may also be describes as part of the Internet of Things (IoT). Both these peripheral devices 986 and the sensors 987 may communicate with the VR headset 400 wirelessly, for example, via Blutooth®, As described above, the user 980 may have created a user registration 982 with the system, e.g., the server. This user registration provides for communication between the VR headset 400 and the server of the system described above. The user registration 982 will be paired with a device registration 984 that identifies and enables communication between the server of the system and the VR headset 400. The VR headset 400 may download and install a client application that provides the communication to the server, including transmitting data to the server and receiving instruction from the server.

The VR headset 400 may also feed usage information to the cloud data storage 672 and the VR usage database 772 described above. The VR headset 400 may also support a platform-specific voice-based search feature 988 in which speech from the user is transduced by a microphone of the headset and recognized to provide commands to the system. The user's speech may also be monitored for data indicative of a negative effect of using the VR system on the user. This speech analysis may also be input to the AI unit and considered in the model or models for predicting negative effect.

Figure 10:
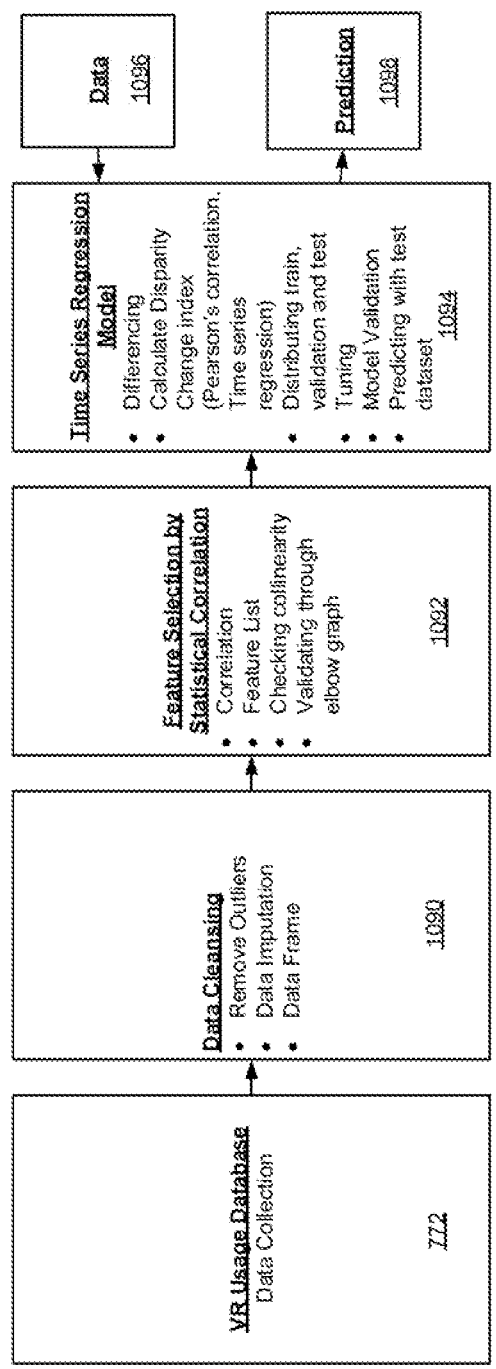
FIG. 10 is a flowchart for generating a time series regression model, consistent with the disclosed implementations.

FIG. 10 is a flowchart for generating a time series regression model, consistent with the disclosed implementations. As shown in FIG. 10, data is collected in the VR usage database 772. Thereafter, the data may be cleansed 1090 by remove outliers, data imputation and dividing the data into frames. Data cleansing may include determining outliers and removing outliers from the data set. Data cleansing may include normalizing or smoothing the data. Data cleansing may include interpolating missing data points and providing interpolated data points into the subsequent analysis. The data cleansing may be automated, semi-automated, or curated by an expert. The data cleansing may be reduced as the size of the dataset grows.

Next, feature selection by statistical correlation 1092 is then performed. This includes creating a feature list, checking collinearity and validating the data through an elbow graph. The data with revised features is then fed to a time series regression model 1094. The model provides differencing of the data and calculates a Disparity Change Index (e.g., with Pearson's correlation or Time Series Regression). The model than performs distributing train, validation and test; then tuning and model validation including prediction with a test dataset. In some examples, the dataset is split into a modeling dataset and a test data set. For example, the dataset may be split 80:20 or 70:30 between modeling data points and test data points. The modeling data points are used to generate the model and the test data points are used to test and validate the model.

Once established the model 1094 receives sensor data 1096 as an input, as described above. Using the sensor data 1096, the model 1094 makes a prediction 1098 as to a negative effect that is or will be experienced by the user. The model adds all new data to the training set and continues to improve the predications as more user data is added.

In an example using eye tracking as the sensory input, this approach can be outlined as follows.
1. Collect the data from VR using the eye tracking sensors.
   a. Data related to the eye movement
   b. Eye blinking rate
   c. Pupil dilation
   d. Widening of eyes
   e. incorporated in the proposed model is the previous state of eye fatigue (EPprev)
2. After this, create a dataset using all the collected features.
3. The Pearson correlation is used between the disparity change of the current and previous frame.
4. Data preprocessing is then performed. This includes, but is not limited to, feature scaling and replacing null, invalid, and missing data.
5. Post data preprocessing, the dataset is mostly ready. It may also be helpful to perform a reduction in the dimensions of the dataset and retain only those columns/factors that make significant contributions to the result.
6. Divide the dataset into training and test datasets. In some examples, the ratio is 70:30 or 80:20 training to test.
7. The training dataset is then supplied to the algorithm to train on. In some examples, Time Series Regression is the model of choice as results may be based on the time frames. However, other models may be used without departing from the scope of the claimed invention.
8. Results are calculated for all eye fatigue, anxiety and radiation exposure issue and cumulative result will be given.
9. Some tuning may be required to be done after getting the recommendation results.
10. Once the tuning is done, the model is tested on the test dataset.
11. Finally, the model is tested with several new and full datasets.
12. The model is ready and keeps learning as it grows and accommodates more and more users.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of managing user experience with a virtual reality (VR) headset, the method comprising:
   with a server, receiving data from sensors that detect parameters associated with a user during use of the VR headset by the user;
   with the server, applying the data from the sensors as input to a model to predict a negative effect on the user resulting from the use of the VR headset;
   with the server, taking an action to minimize the negative effect on the user resulting from the use of the VR headset that is predicted based on an output of the model;
   with the server, receiving a user input from the user associated with the use of the VR headset by the user, the user input comprising a response to a survey question administered to the user, the response to the survey question indicative of a benefit perceived by the user responsive to the action taken by the server to minimize the negative effect on the user resulting from the use of the VR headset; and
   with the server, using the response to the survey question to train the model.

2. The method of claim 1, wherein receiving the data from the sensors comprises receiving data from a device worn by the user that monitors a heart rate of the user.

3. The method of claim 1, wherein receiving the data from the sensors comprises receiving data from a hand-held device operated by the user during the use of the VR headset.

4. The method of claim 1, wherein receiving the data from the sensors comprises receiving data from an eye sensor in the VR headset.

5. The method of claim 4, further comprising using an output from the eye sensor to identify the user.

6. The method of claim 4, wherein the eye sensor measures at least one of: radiation, eye movement, eye blinking rate, pupil dilation, or eye widening.

7. The method of claim 1, wherein the model comprises a time series regression model and the negative effect on the user resulting from the use of the VR headset comprises headache, eye strain, or anxiety experienced by the user.

8. The method of claim 7, wherein the action taken by the server to minimize the negative effect on the user resulting from the use of the VR headset comprises causing a display of the VR headset to emit less blue light.

9. The method of claim 7, wherein the action taken by the server to minimize the negative effect on the user resulting from the use of the VR headset comprises causing a decrease in brightness of a display of the VR headset.

10. The method of claim 7, wherein the action taken by the server to minimize the negative effect on the user resulting from the use of the VR headset comprises causing the VR headset to recommend a different program for viewing by the user.

11. The method of claim 7, wherein the action taken by the server to minimize the negative effect on the user resulting from the use of the VR headset comprises causing the VR headset to recommend a break in usage to the user or turning off the VR headset.

12. The method of claim 1, wherein the action taken by the server to minimize the negative effect on the user resulting from the use of the VR headset comprises causing the VR headset to adjust a screen temperature of the VR headset.

13. The method of claim 1, further comprising causing, with the server, the survey question to be administered to the user via the VR headset.

14. A virtual reality (VR) headset, the headset comprising:
a display for displaying a virtual reality program to a user;
a wireless transceiver; and
a processor, the processor programmed to use the wireless transceiver to:
communicate with sensors to receive data associated with the user during use of the VR headset by the user;
transmit the data from the sensors to a server that predicts a negative effect on the user resulting from the use of the VR headset by the user based on the data from the sensors;
receive instructions from the server to take a first action to mitigate the negative effect on the user resulting from the use of the VR headset;
execute the instructions to take the first action to mitigate the negative effect on the user resulting from the use of the VR headset;
administer, via the display, a survey question to the user;
receive, from the user, a response to the survey question indicative of a benefit perceived by the user responsive to the first action taken to mitigate the negative effect on the user resulting from the use of the VR headset;
transmit the response to the survey question to the server such that the server can use the response to the survey question to identify a second action to mitigate the negative effect on the user resulting from the use of the VR headset;
receive instructions from the server to take the second action to mitigate the negative effect on the user resulting from the use of the VR headset; and
execute the instructions to take the second action to mitigate the negative effect on the user resulting from the use of the VR headset.

15. A non-transitory computer-readable storage medium comprising instructions that, when executed, cause a server to:
receive, via a network interface, data from sensors that detect parameters associated with a user during use of a virtual reality (VR) headset by the user;
apply the data from the sensors as input to an artificial intelligence model to predict a negative effect on the user resulting from the use of the VR headset; and
instruct the VR headset to take a first action to mitigate the negative effect on the user resulting from the use of the VR headset based on a first output of the artificial intelligence model
receive a user input from the user associated with the use of the VR headset by the user, the user input comprising a response to a survey question administered to the user, the response to the survey question indicative of a benefit perceived by the user responsive to the first action taken to mitigate the negative effect on the user resulting from the use of the VR headset
apply the user input to the artificial intelligence model to identify a second action to mitigate the negative effect on the user resulting from the user of the VR headset; and
instruct the VR headset to take the second action to mitigate the negative effect on the user resulting from the user of the VR headset based on a second output of the artificial intelligence model.

16. The VR headset of claim 14, wherein the sensors comprise sensors that are located on a device worn by the user and monitor biometrics of the user.

17. The non-transitory computer-readable storage medium of claim 15, wherein the sensors comprise sensors that are located on a device worn by the user and monitor biometrics of the user.

18. The headset of claim 14, wherein:
the first action comprises at least one of emitting less blue light from the display, decreasing a brightness of the display, or adjusting a screen temperature of the display; and
the second action comprises at least one of emitting less blue light from the display, decreasing the brightness of the display, adjusting the screen temperature of the display, or recommending changing the virtual reality program.

19. The non-transitory computer-readable storage medium of claim 15, wherein:
the first action comprises at least one of emitting less blue light from the display, decreasing a brightness of the display, or adjusting a screen temperature of the display; and
the second action comprises at least one of emitting less blue light from the display, decreasing the brightness of the display, adjusting the screen temperature of the display, or recommending changing the virtual reality program.

20. The non-transitory computer-readable storage medium of claim 15, further comprising using the response to the survey question to train the artificial intelligence model.

* * * * *